US009687684B2

(12) United States Patent
Bissett et al.

(10) Patent No.: US 9,687,684 B2
(45) Date of Patent: Jun. 27, 2017

(54) SAFETY LINE ANCHOR

(71) Applicant: Latchways PLC, Devizes (GB)

(72) Inventors: Timothy Bissett, Devizes (GB); David Nash, Devizes (GB); Richard Beale, Trowbridge (GB)

(73) Assignee: Latchways PLC, Devizes (GB)

( * ) Notice: Subject to any disclaimer, the term of this patent is extended or adjusted under 35 U.S.C. 154(b) by 0 days.

(21) Appl. No.: 14/987,976

(22) Filed: Jan. 5, 2016

(65) Prior Publication Data

US 2016/0166860 A1 Jun. 16, 2016

Related U.S. Application Data

(63) Continuation of application No. 13/981,122, filed as application No. PCT/GB2012/050155 on Jan. 25, 2012, now Pat. No. 9,227,093.

(30) Foreign Application Priority Data

Jan. 26, 2011 (GB) .................................. 1101303.4

(51) Int. Cl.
*A62B 35/00* (2006.01)
*F16B 45/04* (2006.01)
*A62B 35/04* (2006.01)

(52) U.S. Cl.
CPC .......... *A62B 35/0068* (2013.01); *A62B 35/04* (2013.01); *F16B 45/04* (2013.01)

(58) Field of Classification Search
CPC ... A60B 35/04; A60B 35/0068; A60B 35/027; Y10S 248/925; A62B 1/00; A62B 1/04; E06C 7/186; E06C 7/187; F16B 45/04
USPC ...... 248/74.2, 122.1, 925; 182/8, 192, 36, 5, 182/3; 24/598.7, 600.7, 905, 82.17
See application file for complete search history.

(56) References Cited

U.S. PATENT DOCUMENTS

| | | | | |
|---|---|---|---|---|
| 3,177,543 | A | 4/1965 | Fountain | |
| 3,179,994 | A | 4/1965 | Meyer et al. | |
| 4,066,368 | A | 1/1978 | Mastalski et al. | |
| 4,399,890 | A | 8/1983 | Bartels et al. | |
| 5,015,023 | A * | 5/1991 | Hall | F16G 11/04 24/115 G |
| 5,588,188 | A | 12/1996 | Jermyn, Jr. | |

(Continued)

FOREIGN PATENT DOCUMENTS

| | | |
|---|---|---|
| AU | 2010101026 | 10/2010 |
| DE | 20 2007 012803 | 2/2009 |

(Continued)

*Primary Examiner* — Anita M King
(74) *Attorney, Agent, or Firm* — Gordon & Jacobson, P.C.

(57) ABSTRACT

An anchor arrangement for a safety line system is for use with a bracket to secure to a structure for mounting the safety line. The anchor arrangement includes at least one of a resilient biasing mechanism and a tension indicator. The resilient biasing mechanism acts between the bracket and a reaction member provided as part of the anchor arrangement. The tension indicator can be a part of the bracket aligned adjacent an indicia zone on the anchor arrangement. The tension indicator can also include an indicator element which can be fixed to the anchor arrangement and extend through a slot or aperture in the bracket. The indicator element can also be separate from the bracket and moveable with respect to the bracket.

16 Claims, 2 Drawing Sheets

(56) References Cited

U.S. PATENT DOCUMENTS

| | | | |
|---|---|---|---|
| 5,782,442 | A | 7/1998 | Kwak et al. |
| 7,387,284 | B2 | 6/2008 | Chang |
| 8,061,482 | B2 * | 11/2011 | Lara .................. A62B 35/0087 182/3 |
| 8,584,796 | B2 * | 11/2013 | Lara ...................... A62B 35/04 182/3 |
| 9,227,093 | B2 | 1/2016 | Bissett et al. |
| 2007/0062759 | A1 | 3/2007 | Jones et al. |
| 2008/0006750 | A1 | 1/2008 | Flux |

FOREIGN PATENT DOCUMENTS

| | | |
|---|---|---|
| EP | 1 054 708 | 7/2001 |
| GB | 2 403 256 | 12/2004 |
| WO | WO 2012/101438 | 8/2012 |

* cited by examiner

SAFETY LINE ANCHOR

CROSS-REFERENCE TO RELATED APPLICATIONS

This application is a continuation of U.S. non-provisional application Ser. No. 13/981,122, filed on Jul. 23, 2013, which is the national stage entry of PCT/GB12/50155, filed on Jan. 25, 2012, which claims priority to United Kingdom application serial no. 1101303.4, filed on Jan. 26, 2011, all of which are hereby incorporated by reference herein in their entireties.

BACKGROUND OF THE INVENTION

1. Field of the Invention

The present invention relates to height safety equipment and, in particular, to an anchoring arrangement suitable for anchoring an end, typically the lower end of a flexible elongate safety line, for example disposed in a substantially vertical orientation on a tall structure.

2. State of the Art

Tall structures such as electricity pylons and radio or satellite communication masts are periodically inspected to determine whether any maintenance work is required. These structures are purpose built to be low maintenance and, because many of them stand in remote locations, they may require inspection only once every ten years, perhaps longer.

The invention relates to a new anchor assembly that has application for securing elongate safety lines in various situations and orientations, but particularly a new bottom anchor assembly for securing a substantially vertically-oriented safety line to the lower portion of a tall structure.

The anchor assembly is a quickly manually operable to set to working tension and will provide a visible indication of acceptable tension in the wire being extant. The anchor is designed to grip the safety line in a non-destructive fashion so that it can be re-used repeatedly for a series of inspections on many tall structures. It can also accommodate differences in height between successive tall structures by allowing a different length of safety line to be passed through it before the gripping action is made.

A bottom anchor assembly for a vertical safety line is disclosed in EP1054708. This arrangement has an anchor comprising a threaded tube attached to a safety line clamp. A bracket connects to the anchor structure part way along the length of the tube. A washer threably mounted on the shaft acts on the bracket to change the position of the bracket relative to the tube and so adjust the tension in the safety line.

Another anchor assembly for use with a safety line is shown in U.S. Pat. No. 4,399,890 A. This describes a bottom anchor assembly comprising a safety line and gripping means which secures the safety line to a rod. The rod passes through the bracket and is spring loaded relative to the bracket to keep the cable under tension.

An improved arrangement has now been devised.

SUMMARY OF THE INVENTION

According to a first aspect, the present invention provides an anchor arrangement for a safety line system, the anchor arrangement being for use with a bracket to secure to a structure for mounting the safety line; the anchor arrangement comprising an alignment collar arranged to seat in a seat provided on the bracket; wherein the alignment collar is able to seat in a plurality of different or adjustable orientations with respect to the bracket.

According to a second aspect, the present invention provides an anchor arrangement for a safety line system, the anchor arrangement being for use with a bracket to secure to a structure for mounting the safety line, the anchor arrangement comprising a resilient biasing means acting between the bracket and a reaction member provided as part of the anchor arrangement, the anchor arrangement further including a tension indicating means for indicating the tension in the safety line.

According to a further aspect, the present invention provides an anchor arrangement for a safety line system, the anchor arrangement for use with a bracket to secure to a structure for mounting the safety line; the anchor arrangement comprising tension indicating means for indicating the tension in the safety line, wherein the tension indicating means comprises a part of the bracket aligned adjacent and indicia zone on the anchor arrangement.

It is preferred that the seat provided on the bracket comprises a seat aperture.

In a preferred embodiment, the alignment collar has an aperture and the axis of the aperture in the alignment collar re-orientates as the alignment collar adjusts to different seated orientations with respect to the seat provided in the bracket.

In a preferred realisation of the invention the alignment collar has an arcuate or curved outer bearing surface.

The seat provided on the bracket preferably has a linear inclined bearing surface for contacting the alignment collar.

The provision of the arcuate or curved outer bearing surface on the alignment collar and the linear inclined bearing surface of the bracket seat facilitate the angular repositioning of the alignment collar and provide a self aligning facility under the tension of the safety line.

In one embodiment (where the seat comprises an aperture) the seat aperture provided on the bracket may have a frustconical bearing surface for contacting the alignment collar.

Beneficially, the alignment collar is mounted loose fit about an elongate tube, the axis of the collar being arranged generally in the direction of the axis of the tube, but angularly adjustable over a limited degree.

In one embodiment, it is preferred that the collar is biased into engagement with the seat aperture by means of resilient biasing means (preferably a compression spring), preferably acting between the bracket and a reaction member provided as part of the anchor arrangement.

In a preferred embodiment, the anchor arrangement includes a tube having an external threaded portion, the safety line passing internally of the tube and a tensioning means being threaded externally on the threaded portion of the tube.

Beneficially, the arrangement includes a clamp, provided for clamping the anchor arrangement to the safety line.

In one preferred embodiment, the tension indicating means comprises an elongate indicator element spaced from a tube for receiving the safety line. In such an embodiment the elongate indicator element may extend substantially parallel to the tube for receiving the safety line.

In certain embodiments it is preferred that the tension indicating means comprises an indicator element fixed to the anchor means and extending through a slot or aperture in the bracket. This has the ability to reduce the risk of damage to the indicating means.

As indicated previously, though suitable for other applications, the invention is particularly applied to a bottom anchor arrangement for a vertical or upright orientated safety line.

The invention will now be further described in a specific embodiment, by way of example only, and with reference to the accompanying drawings.

DETAILED DESCRIPTION OF THE PREFERRED EMBODIMENTS

Figure 1:
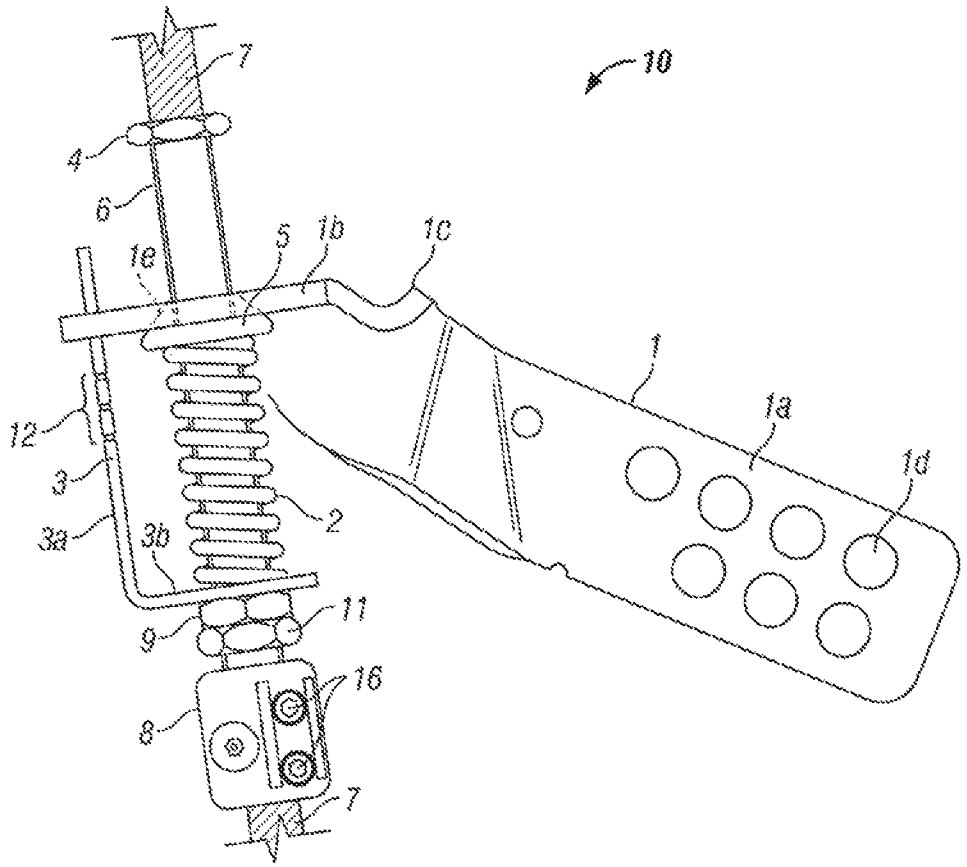
FIG. 1 is a schematic side view of a vertical cable system anchor arrangement in accordance with the invention.
Figure 2:
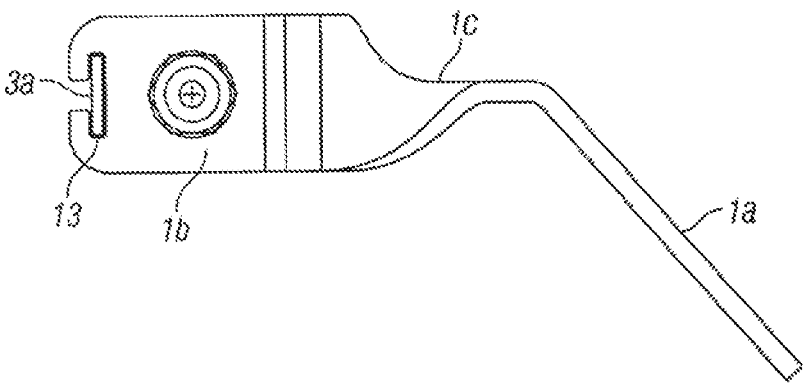
FIG. 2 is a plan view of the anchor arrangement of FIG. 1.
Figure 3:
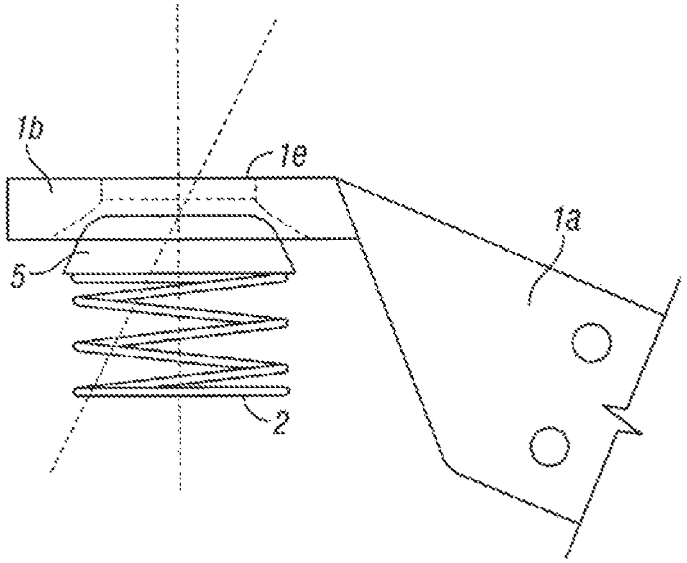
FIG. 3 is a schematic explanatory view of the arrangement.
Figure 4:
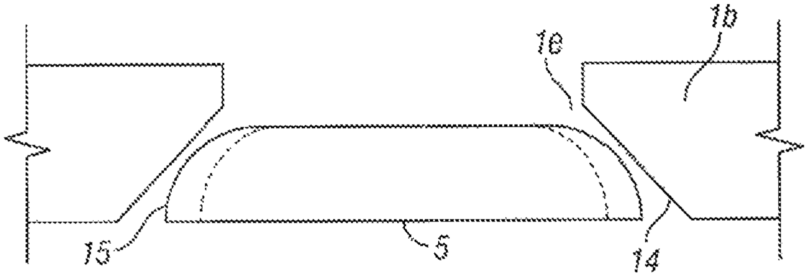
FIG. 4 is a further explanatory view showing the principal operation of an aspect of the invention.

Referring to the drawings and initially to FIG. 1, there is shown an anchor arrangement for a vertical cable system. The invention is also applicable to systems where the cable is not orientated specifically vertically but rather inclined to the vertical or even orientated horizontally.

The bottom anchor assembly 10 comprises an externally threaded shaft 6, to which is operationally secured, a bottom clamp block 8 which is arranged to clamp the safety line 7 by means of the grub screws 16 drawing two halves of the clamp block together. This arrangement is show in, for example, EP1054708. Also mounted on the externally threaded shaft 6 and therefore, comprising the bottom anchor assembly 10, are a compression spring 2, an alignment collar 5, tension indicator 3, tensioning nut 9 and a lock nut 11.

The bottom anchor assembly 10 cooperates use with a mounting bracket 1 which is arranged to be secured to a structure (such as a pylon or building) for mounting the safety line 7 to run vertically or at an inclined angle upwardly. The mounting bracket 1 comprises an anchor section 1*a* provided with apertures 1*d* for securing to the structure, and a line securing section 1*b* extending transversely to the anchor section 1*a*. A twist section 1*c* is provided between the line securing section 1*b* and the anchor section 1*a*.

The anchor section 1*a* is provided with a central aperture 1*e* through which passes the external diameter of the threaded shaft 6. The diameter of the aperture 1*e* is greater than the diameter of the threaded shaft 6 such that the threaded shaft 6 can pass cleanly through the aperture 1*e*. There is no threaded connection between the mounting bracket line securing section 1*b* and the threaded shaft 6.

Furthermore, the safety line 7 secured by the clamp block 8 at the lowest most portion of the bottom anchor assembly 10 extends upwardly through the internal bore of the threaded shaft 6 to exit at the top of the shaft which is defined by the upper nut 4. In this way, the safety line 7 is secured relative to the shaft 6 by means of the clamp block 8. The clamp block 8 is fixed to the tube 6 as disclosed in EP1054708.

Engagement between the anchor assembly 10 and the mounting bracket 1 is by means of engagement of the alignment collar 5 with the surface of the aperture 1*e* in the mounting bracket 1. The alignment collar 5 has an outer arcuate (concave) bearing surface 15 which is arranged to seat in a frusto-conical bearing surface 14 of the aperture 1*e* in the mounting bracket 1. The frusto-conical bearing surface 14 is effectively a linear surface against which the arcuate surface 15 of the alignment collar 5 seats. The collar 5 also seats the upper end of the compression spring 2.

The connection between the arcuate bearing surface of the alignment collar 5 and the frusto-conical bearing surface of the mounting bracket 1 ensures that the collar 5 can seat adequately in the aperture 1*e* with the axis of the safety line 7 extending over a range of angular inclinations with respect to the mounting bracket 1. This enables the system to compensate for any misalignment of the mounting bracket 1 and ensures that the safety line 7 can be aligned accurately (for example vertically) even if the mounting bracket 1 is incorrectly set in position. Effectively, the axis of the aperture in the alignment collar 5 re-orientates as the alignment collar adjusts to different seated orientations with respect to the seat aperture 1*e* provided in the bracket. The seat aperture 1*e* provided on the bracket effectively has a linear inclined bearing surface for contacting the alignment collar 5. The provision of the arcuate or curved outer bearing surface 15 on the alignment collar 5 and the linear inclined bearing surface 14 of the bracket seat 1*e* facilitate the angular repositioning of the alignment collar and provide a self aligning facility under the tension of the safety line. The alignment collar 5 is mounted loose fit about the elongate tube 6, the axis of the collar 5 being arranged generally in the direction of the axis of the tube 6, but angularly adjustable over a limited degree.

The tension in the safety line 7 can be adjusted by means of rotating tensioner 9 on the threaded shaft 6 to move either upwardly or downwardly in the longitudinal direction of the shaft 6. Rotating the tensioning nut 9 to move upwardly in FIG. 1 causes the tensioning spring 2 to compress and the bottom bracket 8 to move downwardly with respect to tensioning nut 9. This increases tension in the safety line 7, where rotation of the tensioning nut 9 in the opposite direction has the opposite effect (i.e., of reducing the tension of safety line 7). Once the required tension is present, the lock nut 11 can be rotated to abut against the tensioning nut 9 to secure in the relevant position.

The arrangement also carries the tension indicator 3 which has an upwardly extending tongue 3*a* provided with a tension indicating marker or markers 12 and a transverse limb 3*b* at its lower end which is provided with an aperture though which the threaded shaft 6 passes (not being in threaded engagement however). The upper end of the indicator tongue 3*a* extends through a slot 13 provided at the end of the section 1*b* of the anchor 1. The guide slot constrains the movement of the tongue 3*a* and also protects the indicator tongue 3*a* from damage. The indicator tongue 3*a* is spaced from and extends substantially parallel to the tube 6 extend.

The presence of the tension indicator 3 provides that the tension in the safety line 7 can be gauged. Differences in the tension may arise as a result of climatic factors. In hot periods of weather the safety line 7 may expand as a result of heating and the tension will accordingly change. The gauge can be used to show whether the change in tension remains within acceptable limits and this can be easily seen upon inspection prior to an operative connecting themselves to the safety line 7. Conversely in cold weather the safety line 7 can contract increasing the tension and again, it can be gauged whether this is in acceptable limits. The compression spring enables the arrangement to cope with thermal expansion and contraction in the safety line whilst maintaining the tension in the safety line between acceptable limits.

The invention provides an improved anchor structure enabling self alignment, for example, when bracket 1 is secured in a position which is not absolutely true and also, enabling spring tension to be provided to the safety line 7 and additionally, accurate assessment and or gauging of the tension.

The invention claimed is:

1. An anchor arrangement for a safety line system, comprising:

a bracket to secure to a structure for mounting a safety line; and a resilient biasing means acting between the bracket and a reaction member provided as part of the anchor arrangement, the anchor arrangement further including a tension indicating means for indicating the tension in the safety line, wherein the tension indicating means comprises an indicator element fixed to the anchor arrangement and extending through a slot or aperture in the bracket.

2. The anchor arrangement according to claim 1, wherein the tension indicating means comprises a part of the bracket positioned adjacent an indicia zone on the anchor arrangement.

3. The anchor arrangement according to claim 1, wherein the resilient biasing means comprises a spring, arranged coaxially about a tube for receiving the safety line.

4. The anchor arrangement according to claim 1, further comprising a tube having an external threaded portion, wherein the safety line passes internally of the tube and a tensioning means being threaded externally on the threaded portion of the tube.

5. The anchor arrangement according to claim 1, further comprising a clamp configured to clamp the anchor arrangement to the safety line.

6. The anchor arrangement according to claim 1, wherein the tension indicating means comprises an elongate indicator element spaced from a tube that receives the safety line.

7. The anchor arrangement according to claim 6, wherein the elongate indicator element extends substantially parallel to the tube that receives the safety line.

8. The anchor arrangement according to claim 1, further comprising a bottom anchor arrangement for a vertical or upright orientated safety line.

9. An anchor arrangement for a safety line system, comprising:

a bracket to secure to a structure for mounting a safety line; and tension indicating means for indicating tension in the safety line, wherein the tension indicating means comprises a part of the bracket aligned adjacent an indicia zone provided on an elongate indicator element, wherein the indicator element is separate from the bracket and moveable with respect to the bracket.

10. The anchor arrangement according to claim 9, wherein a resilient biasing means acts between the bracket and a reaction member provided as part of the anchor arrangement.

11. The anchor arrangement according to claim 10, wherein the resilient biasing means comprises a spring, preferably arranged coaxially about a tube for receiving the safety line.

12. The anchor arrangement according to claim 9, further comprising a tube having an external threaded portion, wherein the safety line passes internally of the tube and a tensioning means being threaded externally on the threaded portion of the tube.

13. The anchor arrangement according to claim 9, further comprising a clamp configured to clamp the anchor arrangement to the safety line.

14. The anchor arrangement according to claim 9, wherein the tension indicating means comprises the elongate indicator element spaced from a tube that receives the safety line.

15. The anchor arrangement according to claim 14, wherein the elongate indicator element extends substantially parallel to the tube that receives the safety line.

16. The anchor arrangement according to claim 9, further comprising a bottom anchor arrangement for a vertical or upright orientated safety line.

* * * * *